United States Patent
Oropeza

(10) Patent No.: US 12,228,167 B2
(45) Date of Patent: Feb. 18, 2025

(54) LEVELING FASTENER

(71) Applicant: Juan Cristobal Oropeza, Tampa, FL (US)

(72) Inventor: Juan Cristobal Oropeza, Tampa, FL (US)

( * ) Notice: Subject to any disclaimer, the term of this patent is extended or adjusted under 35 U.S.C. 154(b) by 173 days.

(21) Appl. No.: 17/992,530

(22) Filed: Nov. 22, 2022

(65) Prior Publication Data
US 2023/0160409 A1 May 25, 2023

Related U.S. Application Data

(60) Provisional application No. 63/283,239, filed on Nov. 25, 2021.

(51) Int. Cl.
*F16B 5/02* (2006.01)
*F16B 35/04* (2006.01)
*F16B 39/282* (2006.01)

(52) U.S. Cl.
CPC .......... *F16B 5/0225* (2013.01); *F16B 35/041* (2013.01); *F16B 39/282* (2013.01); *F16B 5/02* (2013.01)

(58) Field of Classification Search
CPC ........ F16B 5/02; F16B 5/0225; F16B 5/0233; F16B 13/061; F16B 13/124; F16B 13/141; F16B 35/041; F16B 37/04; F16B 37/044–045; F16B 37/048; F16B 37/06; F16B 37/14; F16B 39/282
USPC ............... 411/32, 34, 82, 82.1, 371.2, 372.5, 411/381–382, 383–384
See application file for complete search history.

(56) References Cited

U.S. PATENT DOCUMENTS

| | | | | |
|---|---|---|---|---|
| 4,221,154 A * | 9/1980 | McSherry | ............... | F16B 13/00 411/34 |
| 5,143,498 A * | 9/1992 | Whitman | ............... | F16B 39/021 411/311 |
| 5,249,899 A * | 10/1993 | Wilson | ................. | F16B 39/225 81/125 |
| 6,746,191 B2 * | 6/2004 | Edland | ................ | F16B 13/0808 411/45 |
| 8,186,918 B2 * | 5/2012 | Bucquet | ................ | F16B 13/061 411/82 |
| 8,382,808 B2 * | 2/2013 | Wilberg | ............. | A61B 17/7098 411/82.1 |
| 8,556,558 B1 * | 10/2013 | Hunt | ..................... | F16B 39/021 411/395 |
| 2004/0033120 A1 * | 2/2004 | Ducker, III | .......... | F16B 33/004 411/82.1 |

(Continued)

*Primary Examiner* — Roberta S Delisle

(57) ABSTRACT

A fastener having a cylindrical shank with a fastener head attached to the first shank end, the head having a tool slot for engaging a tool, the tool slot directed away from the first shank end and a lower head surface adjacent the shaft. The cylindrical shank has a head collar adjacent the head, a threaded collar having securing threads, the threaded collar disposed along a portion of the second shank end, a shank smooth portion disposed between head collar and the threaded collar and a grip washer disposed along the collar. The grip washer has a first washer side with a plurality of protrusions and a second washer side having a profile corresponding with the lower head surface, wherein the grip washer is rotatable about the collar and the lower head surface. The fastener includes a retractable frame rotatable about the shank smooth portion.

15 Claims, 23 Drawing Sheets

(56) References Cited

U.S. PATENT DOCUMENTS

| | | | |
|---|---|---|---|
| 2004/0067121 A1* | 4/2004 | Huang | F16B 13/124 411/32 |
| 2004/0109738 A1* | 6/2004 | Ducker, III | F16B 33/004 411/82.1 |
| 2015/0308472 A1* | 10/2015 | Brace | F16B 35/041 411/404 |

* cited by examiner

LEVELING FASTENER

CROSS-REFERENCE TO RELATED APPLICATIONS

This application is a Non-Provisional Patent application claiming priority to U.S. Provisional Patent application Ser. No. 63/283,239 filed on Nov. 25, 2021, which is incorporated by reference herein in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants, make no claim to any trademarks referenced.

BACKGROUND OF THE INVENTION

Field of the Invention

The invention relates to fasteners and more specifically to fasteners which provide adjustments in the use thereof.

Description of Related Art

Currently, there are several solutions to attach two or more pieces together but they do not allow to make changes in the level or height of one piece relative to the other without losing support and grip. Some of these solutions attempt leveling or height adjustments through introduction of small pieces for example as wood shims or other material that could fill the gap between the pieces to keep them separated and give them the required level but this is very time consuming and in many cases is not practical or possible to do, due to the impossibility or undesirability to access the back part of the piece. In many cases and the only way to reach the back of a panel to put an object behind the panel is to open a hole or make a cut in the piece or panel. These solutions fail to meet the needs of the industry because as was mentioned before they take much material are time consuming and required a certain level of skill to do.

Therefore, what is clearly needed is fastener and a method that solves the problems and deficiencies mentioned above.

SUMMARY OF THE INVENTION

It is desirable to have a fastener device that allows the user to make adjustments of level and position of various pieces without losing the attachment and grip of the piece to the structure or to the other piece, thus helping to quickly and easy obtain required leveling from each piece, joint leveling or other uses that requires the adjustments of level. The problem that this invention solves apply in situations such as: installations of panels, logs adjustment, seams and joints leveling, bones leveling and adjustments of positions and any other leveling need situations when various attached pieces. In many of these situation its not possible or desired to access the back part of the panel or piece, even when time is a crucial factor and the user needs to adjust the height for joints matching or other leveling requirements fast and securely. The current fasteners available just let the pieces stay together through adjacency and compression not permitting the user to separate pieces or adjust level without losing compression, thus loosing grip or attachment. The disclosed fastener device and associated method advantageously fill these need and addresses the aforementioned deficiencies by providing a fastener that through a locking system that makes the panels or pieces stay at certain desired height of the fastener allows the part of the fastener that its not blocking the panel or piece to continue work in its path to adjust height both up or down as the user requires. When obtaining the desired point or height of the panel or piece. The user have the possibility if required to inject through an internal channel that extends throughout the interior of the fastener a liquid for a definitive connection of the panel or pieces or any other material required to inject as the application requires.

Disclosed is a system together with an associated mechanical process. The system is made up of a fastener body comprised by a Fastener head with Phillips or other required screwdriver shape and body thread, flat body, internal liquid channel holes for liquid and height channels for extendable arms. The system includes extendable retractable arms. The body of the fastener have height channels in which the expandable retractable arms rest and are attached. This channel is located in the middle upper narrower without thread part of the fastener and delimitate a track for the expansion or contraction of the expandable retractable arms. The thread, the internal channel for materials, side recess holes for material expulsion through the internal channel, screw head and a serrated flange. The materials for the manufacturing of the fastener could vary depending on the application for which will be used as well as the distance and the size of the components. Some of the materials that can be used to manufacture the fastener could be but are not limited to are as example: Metals, Polymers, Ceramics, Composites, etc.

The system may also have one or more of the following components: dented flange washer for added grip, a protective cap for the retractable expandable arms for applications that require protection for the articulated arms and for the material on the back part of the piece, a fixed positioned washer channel in the fastener body, a flexible body attachment attached to the fastener body through a precision and thread mechanism, a pivotable and rotatable hinge, additional pivot point for the retractable arms for smaller gaps openings and a extra hole for material expulsion in the spring channel located in the fastener body.

The disclosed system is unique when compared with other known systems and solutions in that it provides a fastener that help the user to adjust level from two or more pieces and with its functions also permits to rotate and move its position without losing grip and attachment from one piece to the other, this help in many real situations life as example fascia leveling repairs, dry wall repairs, seams leveling, medical bone level adjustment and many other that require a fastener that holds and keep grip and let the user level and secured the pieces even when its impractical or impossible to access the back part of the piece also letting the user to insert liquids for multiple purposes.

The disclosed system is superior in that the overall architecture of the system is unique. More specifically, the system is unique due to the presence of the fastener blocked piece mechanism that hold in place the piece and let the fastener continue its way to the other piece to secure and leveled the height as desired by the user without having to access the back part of the pieces and also for insertion of liquids or other materials. This will lead in simplification and reduction of steps, money and time also getting a more secure way of leveling for users.

The present invention relates to a fastener device and a method associated with the device. The device holds various pieces together through a blocking mechanism which block one piece at certain desired height and allows the other part of the fastener that is not blocking to continue work in its path to adjust up or down the height as the user requires. When obtaining the desired point or height the user has the possibility if required or desired to inject through a internal channel such as used in a needle to inject liquids or materials for immobilization or for other applications required. This device fastener can be used for the need of leveling and adjusting two pieces such as panels, logs, pipes, bones or any other pieces that need to be leveled without losing attachment. The core components of the invention are, which are configured as follows: Fastener body and head with thread, internal channel and holes for internal channel, retractable arms. With respect to the associated method, In order to carry out the method the following core steps are followed: With a drill or a screw driver insert the fastener through the pieces that are desired to level, as the fastener pass the first piece the retractable arms will open holding and blocking from movement the first piece, the fastener will continue its path to the second piece going through the piece, the user at this moment will decide the height required, the user will inject through the channel of the fastener any liquid required or material. Ultimately, at the conclusion of these steps the fastener will allow to adjust the height of the pieces without losing attachment to the other piece or structure thus helping quickly obtaining the leveling of joints or other leveling needed adjustments between pieces and the spread of materials and liquid or pastes solutions easily through the fastener internal channel characteristic.

Another aspect of the present invention is directed to a fastener comprising a cylindrical shank. The cylindrical shank has a first shank end and a second shank end opposite the first shank end. The cylindrical shank has a head attached to the first shank end, the head having a tool slot for engaging a tool, the tool slot directed away from the first shank end and a lower head surface adjacent the shaft. The cylindrical shank has a head collar adjacent the head, a threaded collar having securing threads, the threaded collar disposed along a portion of the second shank end, a shank smooth portion disposed between head collar and the threaded collar and a grip washer disposed along the collar. The grip washer has a first washer side with a plurality of protrusions and a second washer side having a profile corresponding with the lower head surface, wherein the grip washer is rotatable about the collar and the lower head surface. The fastener includes a retractable frame rotatable about the shank smooth portion. The retractable frame includes a first choke slidingly engaged with the shank smooth portion toward the head collar and a second choke slidingly engaged with the shank smooth portion toward the threaded collar. The retractable frame includes a plurality of upper frame arms having a first length and pivotally attached at a first upper frame arm end to the first coke and a plurality of lower frame arm having a second length longer than the first length, the lower frame arms pivotally attached at a first lower frame member end to the second choke. The retractable frame includes a plurality of pivot pins for pivotally securing each corresponding lower frame arm second end opposite the lower frame arm first end to upper frame arm second end opposite the upper frame arm first end and a spring disposed on the shank smooth portion between the first choke and the second choke wherein the spring urges the first choke away from the second choke. The fastener may include a shank opening extending from a first shank end to a second shank end opposite the first shank end and a plurality of extrusion opening extending across the shank length and intersecting the shank opening whereby a fluid is injected in the shank opening and distributed to each of the plurality of extrusion openings. The fastener may include a protective cap disposed over the retractable frame. The fastener may include a fixed path channel for control of the retractable frame.

Another aspect of the present invention is directed to a fastener comprising an upper shank having a first upper shank end and a second upper shank end opposite the first upper shank end, a head attached to the first upper shank end, the head having a tool slot for engaging a tool, the tool slot directed away from the shank end and a lower head surface adjacent the shaft, a head collar adjacent the head, an upper shank attachment groove disposed adjacent the second upper shank end, a lower collar disposed proximate to the upper attachment groove, a shank smooth portion disposed between head collar and the threaded collar, a grip washer disposed along the collar having a first washer side having a plurality of protrusions and a second washer side having a profile corresponding with the lower head surface, wherein the grip washer is rotatable about the collar and the lower head surface and a retractable frame rotatable about the shank smooth portion. The retractable frame includes a first choke slidingly engaged with the shank smooth portion toward the head collar, a second choke slidingly engaged with the shank smooth portion toward the threaded collar and a plurality of upper frame arms having a first length and pivotally attached at a first upper frame arm end to the first coke. The retractable frame includes a plurality of lower frame arm having a second length longer than the first length, the lower frame arms pivotally attached at a first lower frame member end to the second choke, a plurality of pivot pins for pivotally securing each corresponding lower frame arm second end opposite the lower frame arm first end to upper frame arm second end opposite the upper frame arm first end and a spring disposed on the shank smooth portion between the first choke and the second choke wherein the spring urges the first choke away from the second choke. The fastener includes a lower shank having a lower shank attachment groove disposed adjacent one end of the lower shank and having securing threads along an opposite end of the lower shank. The fastener includes a rotatable hinge engageable with the upper shank attachment groove and the lower shank attachment groove for pivotably securing the upper shank with the lower shank. The fastener may include a shank opening extending from a first shank end to a second shank end opposite the first shank end and a plurality of extrusion opening extending across the shank length and intersecting the shank opening whereby a fluid is injected in the shank opening and distributed to each of the plurality of extrusion openings. The fastener may include a protective cap 33 disposed over the retractable frame. The rotatable hinge may be a flexible hose. The fastener may include a fixed path channel for control of the retractable frame.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. the locking, clamping and injection screw for leveling adjustments may, however, be embodied in many different forms and should not be construed as being limited to the embodiments set forth herein; rather, these embodiments are provided by way of illustration only and so that this disclosure will be thorough, complete and fully convey understanding to those skilled in the art. These and other objects, features, and advantages of the present invention will become more readily apparent from the attached drawings and the detailed description of the preferred embodiments, which follow.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

Figure 1:
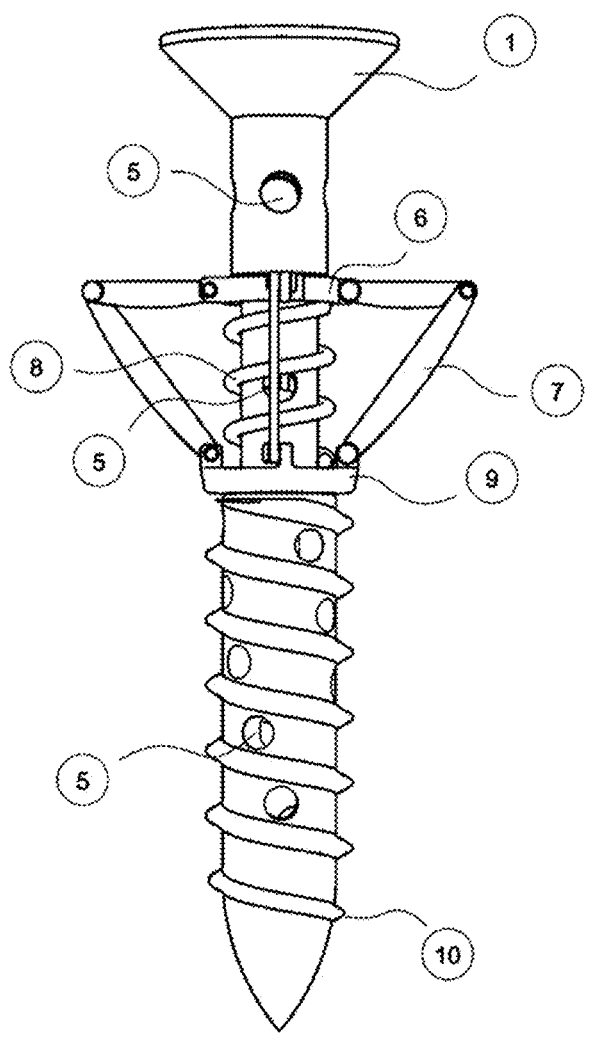
FIG. 1 is side view of the fastener.

Referring now to the drawings FIG. 1-20, and more particularly to FIG. 1, there is shown a locking, clamping and injection screw for leveling adjustments.

In its most complete version, the system is made up of all the components: 1) Fastener Body comprised by: 1.a Fastener head with Phillips or other required screwdriver shape 2. 1.b body thread. 1b.d flat body 1.c Internal liquid channel. 1.d recessed holes for liquid 1.e height channels for extendable arms 2) extendable retractable arms, dented flange and a protective cap for retractable arms The body of the fastener have height channels in which the expandable retractable arms rest and are attached. This channel is located in the middle upper narrower without thread part of the fastener and delimits the path of the retractable arms, the opening and closing of the expandable retractable arms. The fastener fixed channel for retractable arms, a pivotable and rotatable hinge, a elastic body part, side recessed holes for material expulsion through the fastener body, dented flange. The materials for the manufacturing of the fastener could vary depending on the application for which will be used as well as the distance and the size of the components. Some of the materials that can be used to manufacture could be but are not limited to are as example: Metals, Polymers, Ceramics Composites or other material required for the application. These components are combined together to create an architecture for the system that has all the attributes and protective applications for the use of the fastener.

Figure 2:
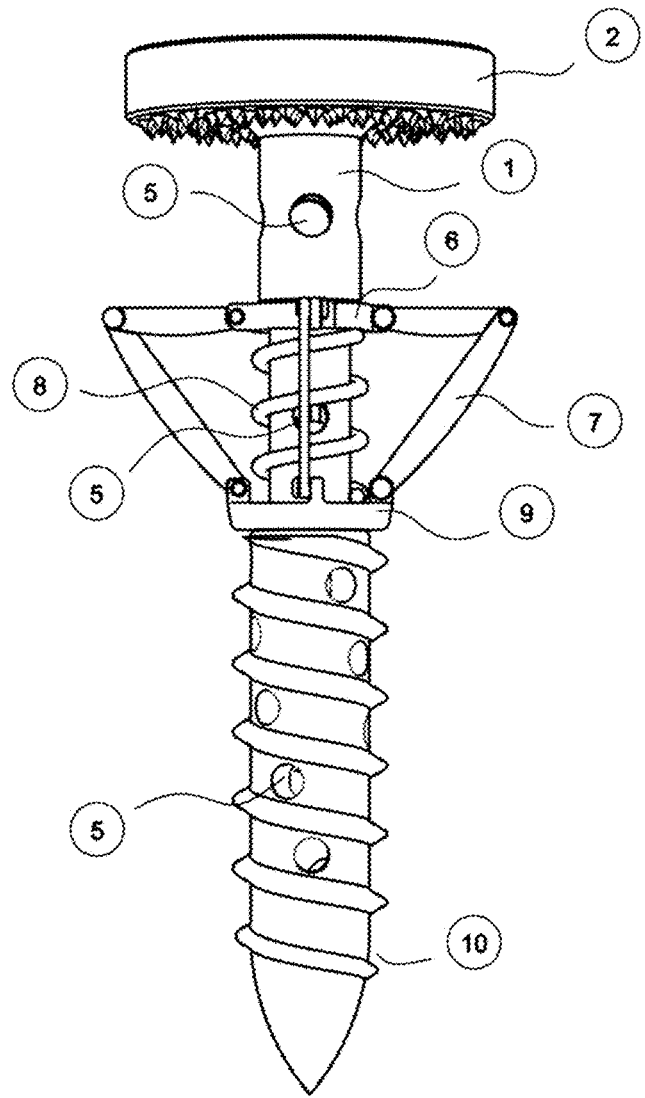
FIG. 2 is a side view of the fastener with optional dented washer.
Figure 6:
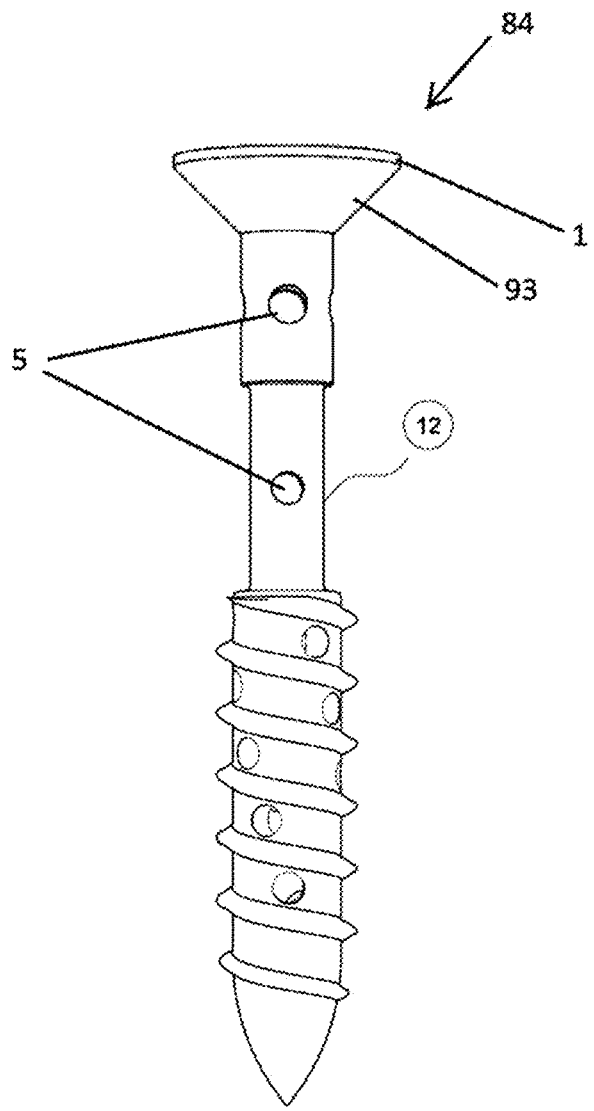
FIG. 6 is a side view of fastener body and channel for mounting retractable arms.
Figure 7:
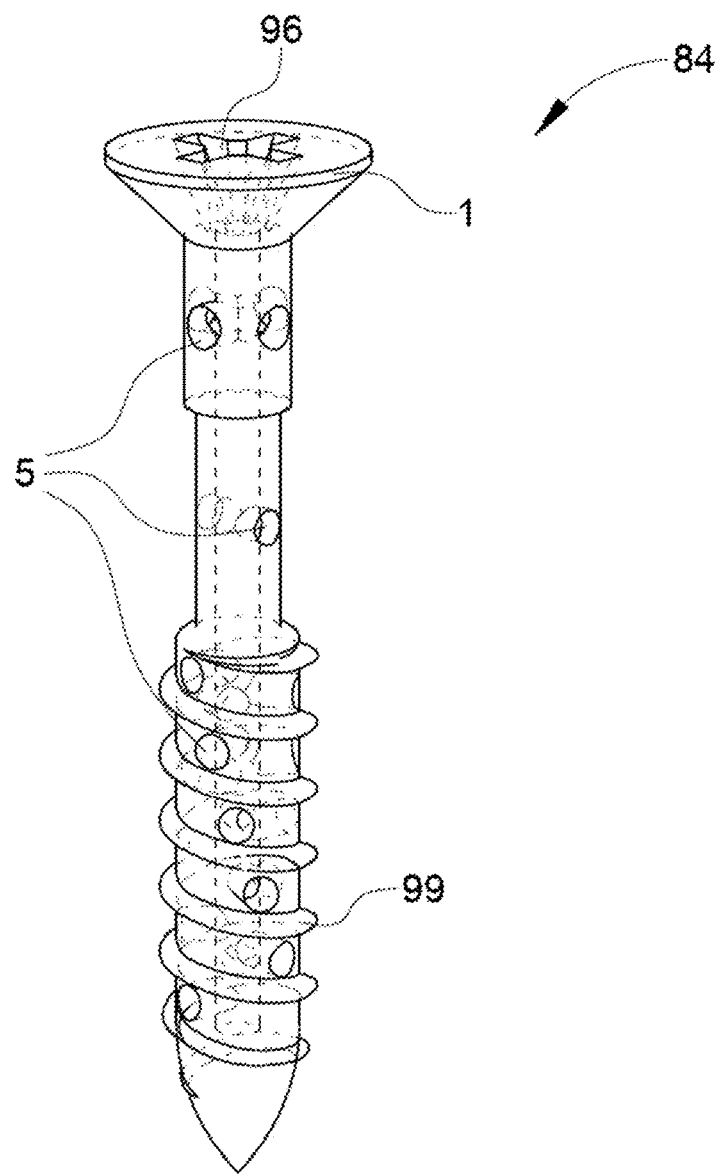
FIG. 7 is a cross view of fastener internal liquid channels and holes for material expulsion.

FIG. 1, FIG. 6 and FIG. 7 Shows side view of the assembled fastener parts: the body of the fastener comprised by screw head 1, the channel for retractable arms 12 mounting which is narrower than the other parts of the screw body to hold and block the path of movement of the spring 8 and the upper and lower arms holders 6 and 9, the internal liquid channel and the recessed holes for the expulsion of material 5. The assembly of the clamping and locking mechanism as follows, in the screw body the spring 8 is inserted in the channel for retractable arms 12, the lower and upper retractable arm holders 6 and 9, are assembled one on top of the spring and the other on the bottom assembling and secured them through pins, pressure, welding, gluing attachment method, thread or pressure mechanism 8, 9, the retractable arms 7 are assembled and connected in their parts through arm holder pins 11. The body of the screw have a hollow internal channel (FIG. 7) for insertion of liquid or other material and expulsed through recessed holes 5 on the sides of the fastener FIG. 2 Shows side view of the fastener with all the components of FIG. 1 plus the optional flange dented washer 2.

Figure 3:
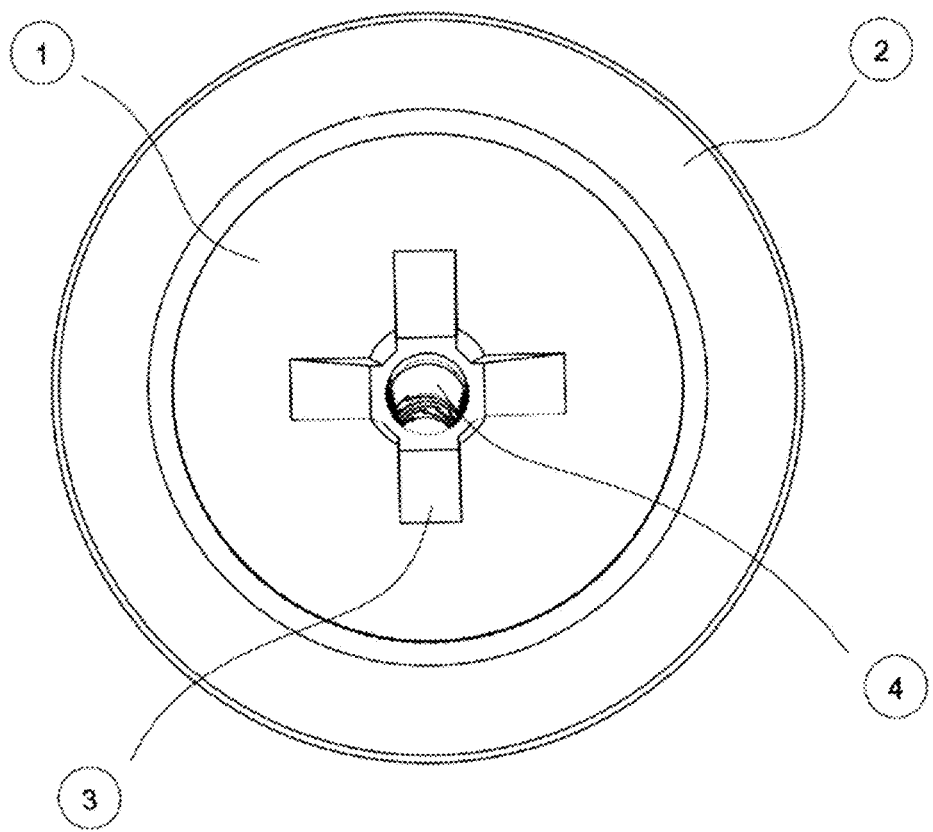
FIG. 3 is an upper view of the screw head.

FIG. 3 Shows screw head 1, the shape for adjustment 3 that could be of any shape known in the industry such as Phillips, hexagon, flat, etc., the optional dented washer 2, and the internal channel for material entry access for material injection 4.

Figure 4:
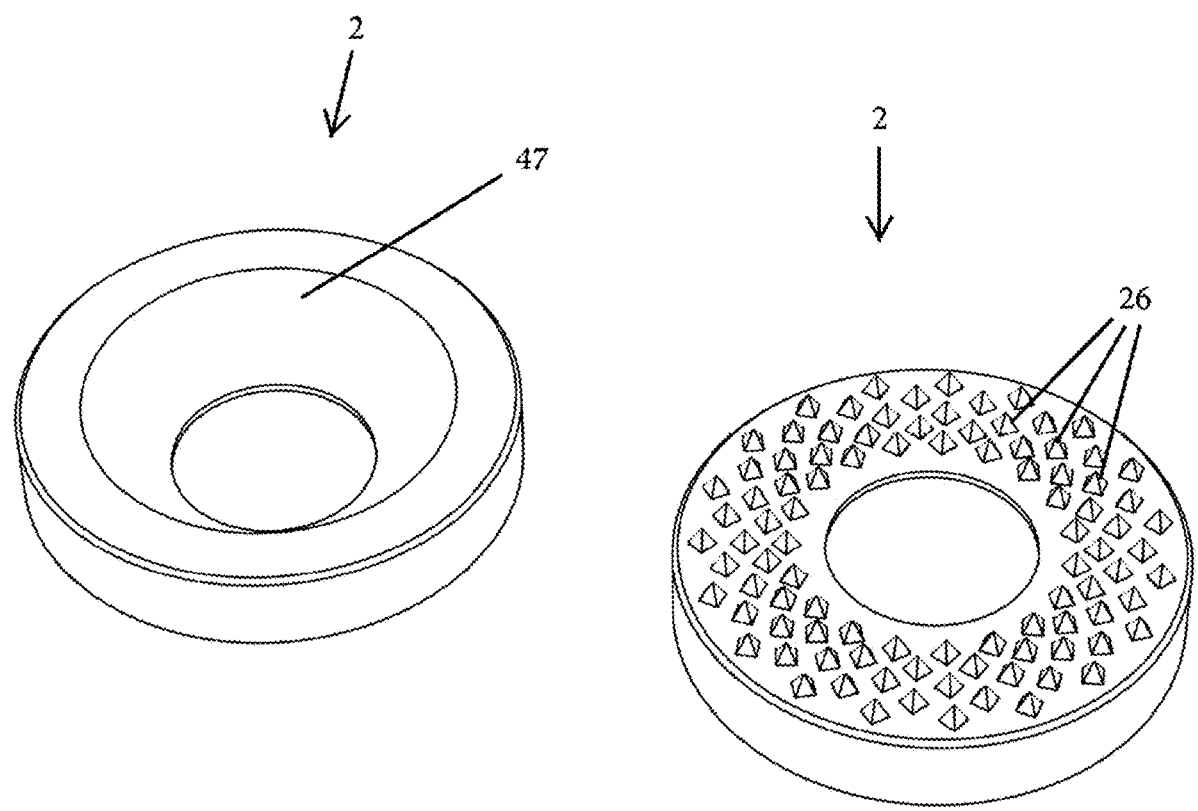
FIG. 4 is a front and back view of the dented washer.

FIG. 4 Shows upper view of the dented flange washer front and back part

Figure 5:
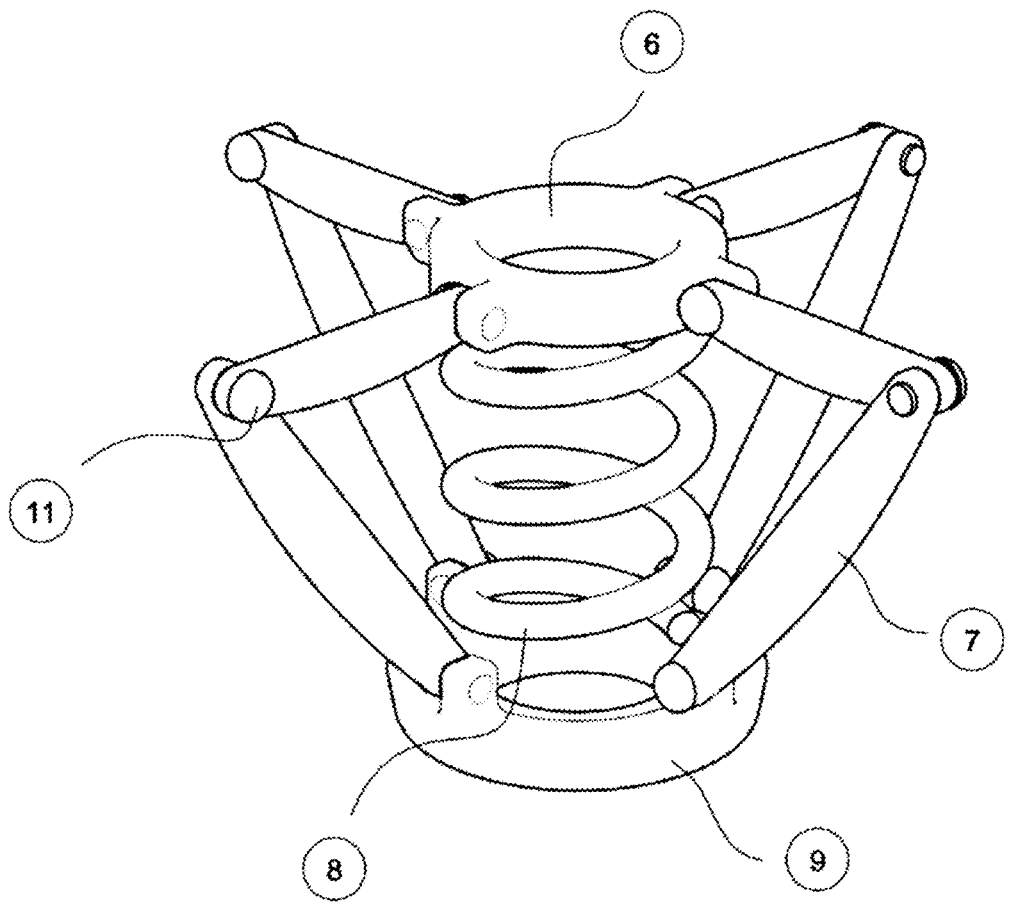
FIG. 5 is an upper side view of the clamping and locking mechanism.

FIG. 5 Shows side view of clamping and locking mechanism assembled which include parts 6 upper retractable arm holder 9 lower retractable arm holder, retractable arms 7, spring 8, pins 11.

FIG. 6. shows a side view of the fastener. In the middle of the screw is the channel for the assembly 12 of the retractable arms locking mechanism which its narrower than the bottom of the screw allowing also the upper part of the screw is narrower than the bottom, the body of the screw wide could be divided in 4 sections. Bottom section thread located part of the screw, middle section or the narrower of the fastener, the upper section of the fastener is narrower than the bottom section more wide than the assembly channel and the 4th section is the screw head.

FIG. 7 shows a side cross view of the fastener internal channels of the screw for material injection and holes for expulsion of the same.

Figure 8:
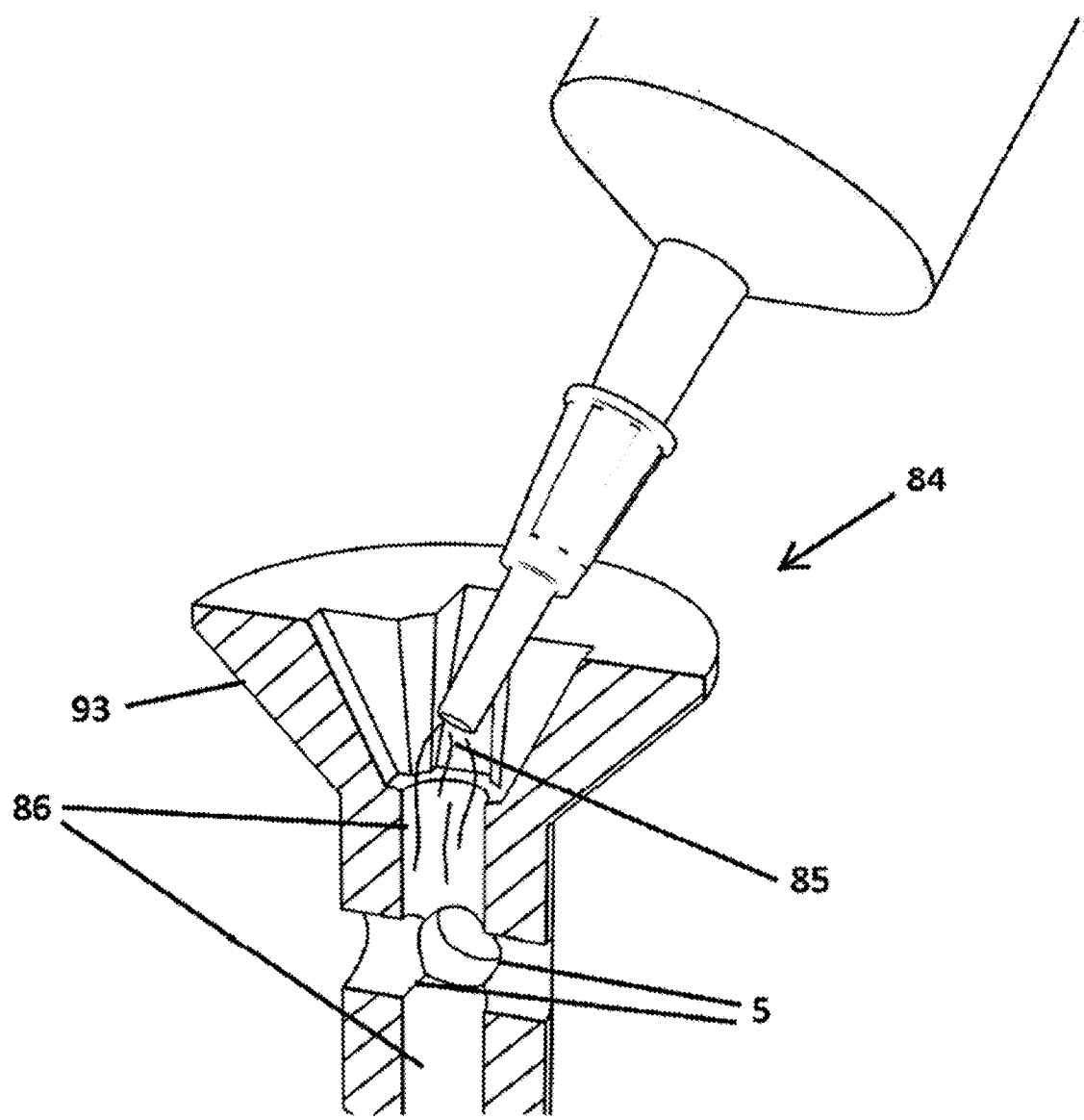
FIG. 8 is a cross upper view of screw head showing injection of liquid through internal channel access point.

FIG. 8 Shows cross view of the head of the fastener with a injecting device injecting material through the internal channel entry access point of the fastener.

Figure 9:
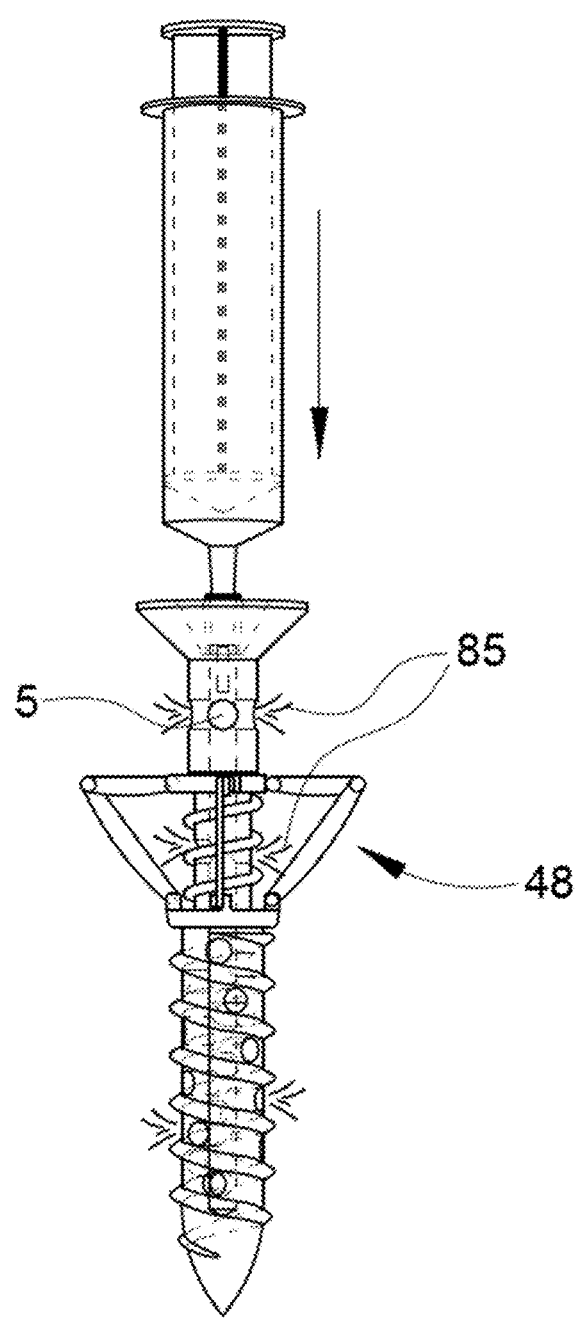
FIG. 9 is a side view of injection of material injection through internal fastener channel and liquid expulsion holes.
Figure 10:
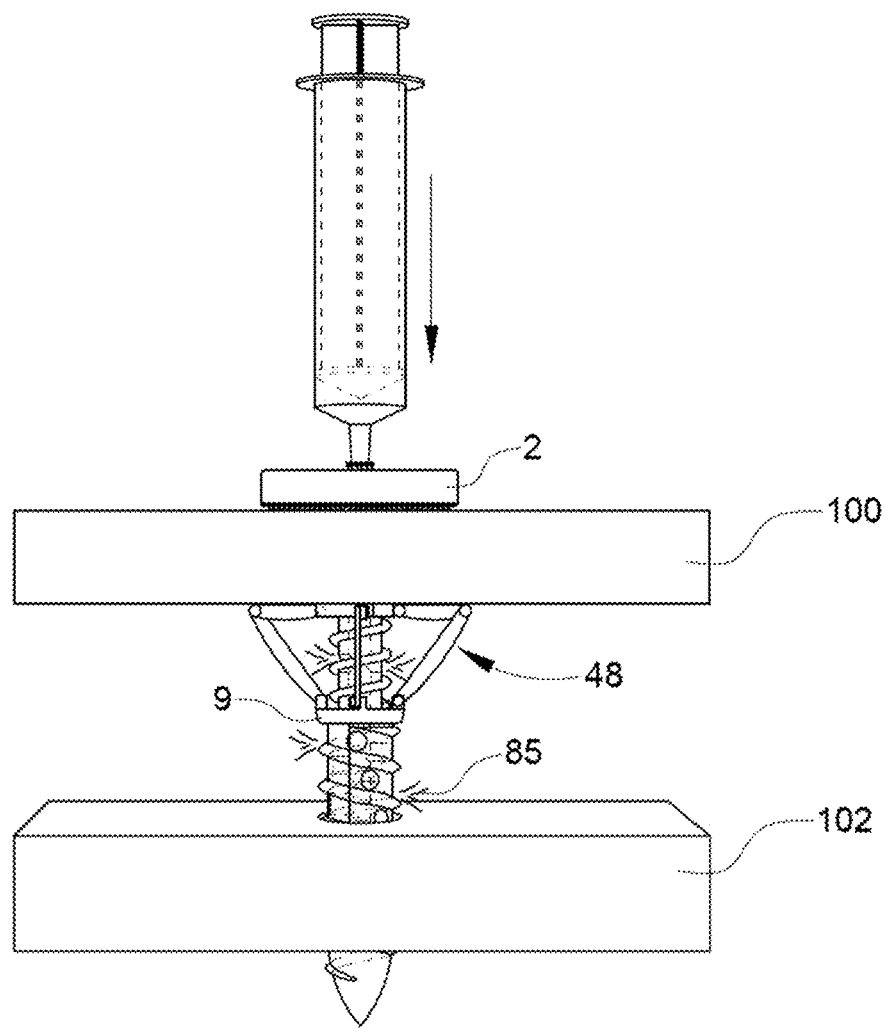
FIG. 10 is a side view of fastener material injection and clamping locking mechanism between two piece and shows method and use of the fastener blocking one piece and continuing its path and attachment to the second piece.

FIG. 9 shows side view of the fastener and process of injection and expulsion of material through internal channel and recessed holes FIG. 10 shows side view of the fastener and process of injection and expulsion of material through internal channel and recessed holes between two panels or two members. The fastener 20 includes the retractable frame 48 which, once expanded rests against the lower surface of member 100. As the fastener head 1 is rotated, the threaded portion of the shank pulls the head 1 toward the second member 102. Once the second choke 6 contacts the second member 102, the second chock is urged toward the first choke until the lower frame arm contacts the first member lower surface whereby the first member 100 is secured a fixed distance from the second member 102.

Figure 11:
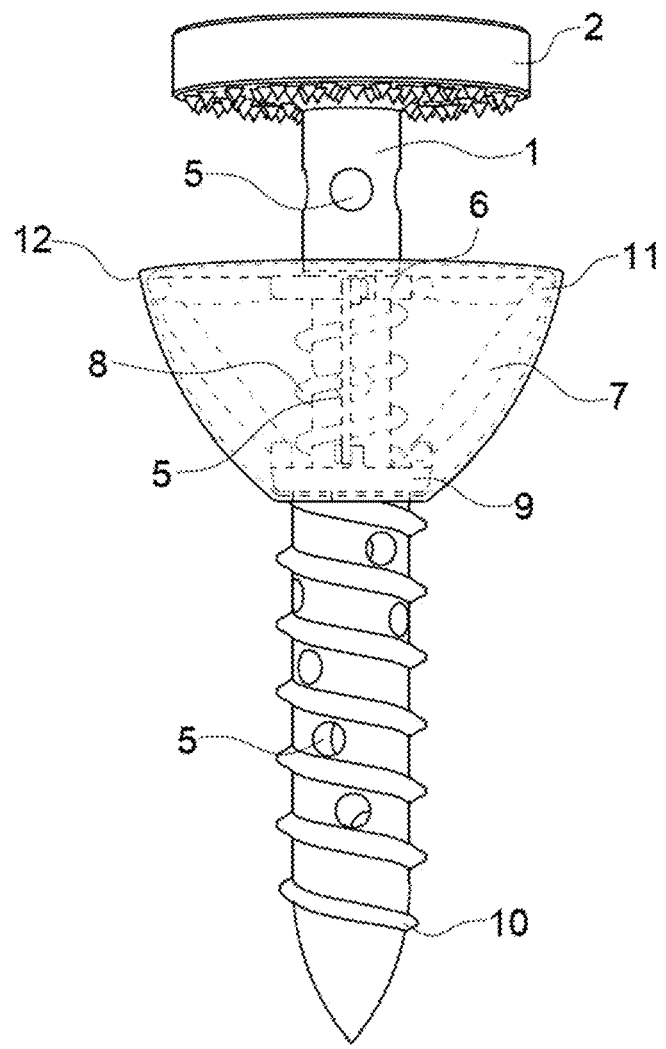
FIG. 11 is a side view of the screw with optional protective cap for extendable arms (washer included version)

FIG. 11 shows side view of the fastener with all the components from (FIG. 2) with the optional protective cap 133 for articulated arms 12 or retractable frame 48.

Figure 12:
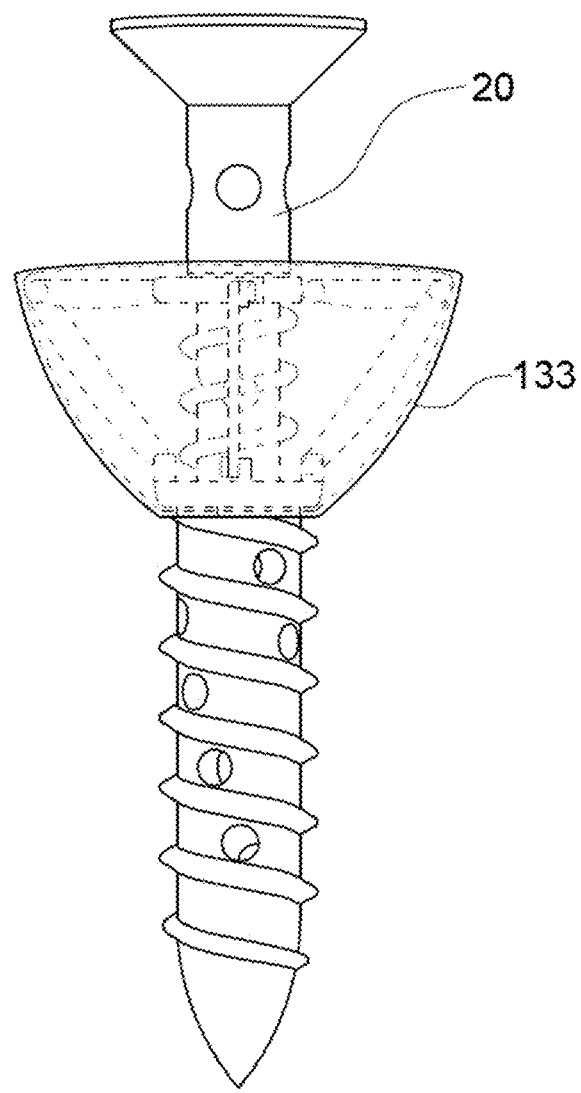
FIG. 12 is a side view of the screw with optional protective cap for extendable arms (Non washer version)
Figure 13:
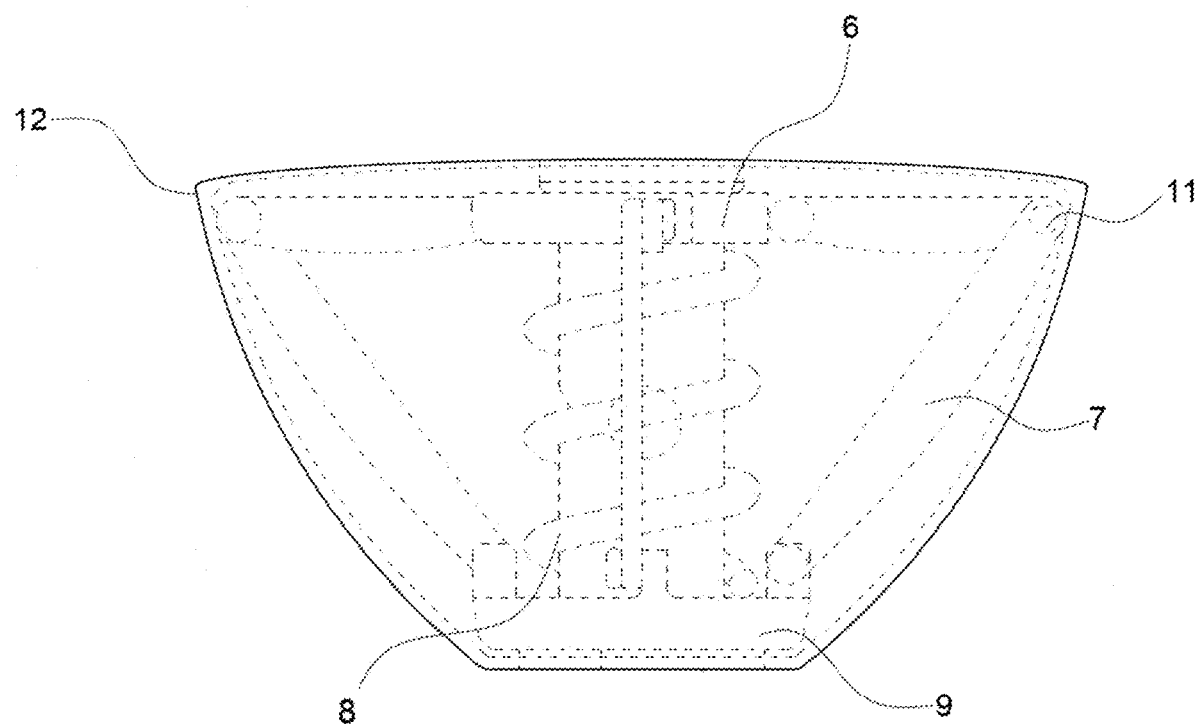
FIG. 13 is a cross view of the protective cap and the clamping locking mechanism.
Figure 14:
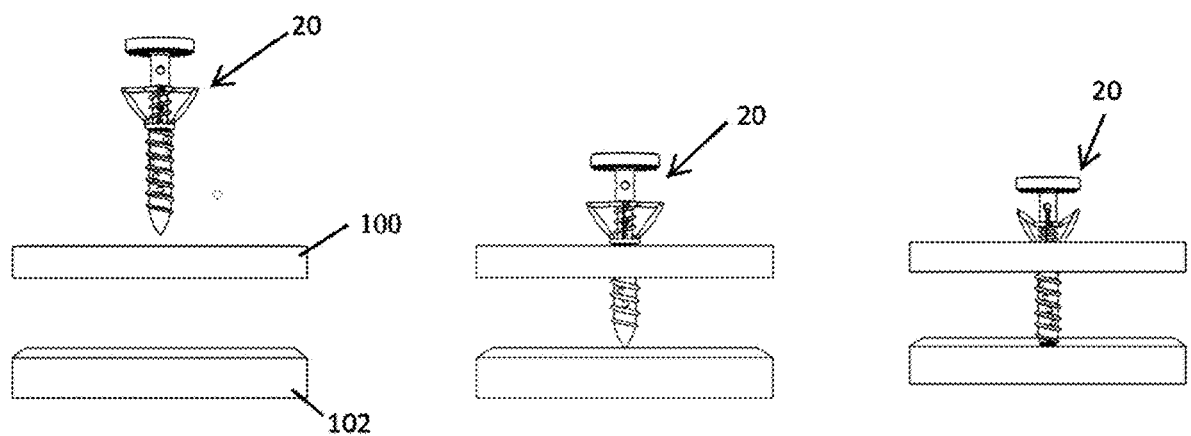
FIG. 14 shows sequence from 14*a* to 14*e* of trajectory through to pieces and how the locking and clamping mechanism function.
Figure 14:
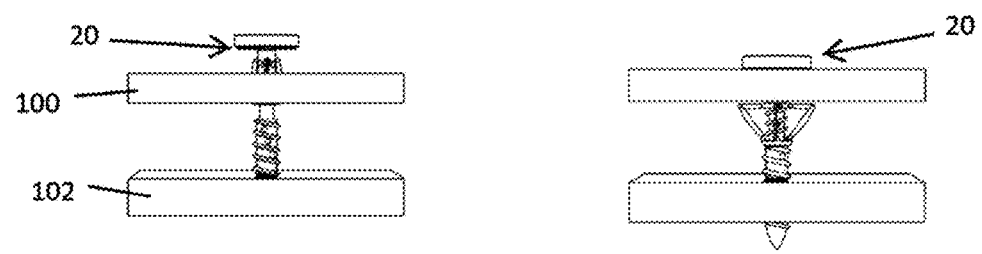

FIG. 12 shows side view of the fastener with all the components from FIG. 1 with the optional protective cap for articulated arms FIG. 13 shows side cross view of the protective cap over the articulated arms mechanism FIGS. 14a-143 show the functioning mechanism of the fastener in different stages of the attachment. With a drill or a screw driver the fastener is inserted through two piece that are desired to level, as the fastener pass the first piece the retractable arms will open, holding and blocking from movement the first piece, then fastener continue its path to the second piece and attach to it, the user at this moment will decide the required height for obtaining leveling between panels screwing the moving the panels up or down just tightening or untightening the fastener. The user could inject any liquid or material suitable through the internal channels that is required.

Figure 15:
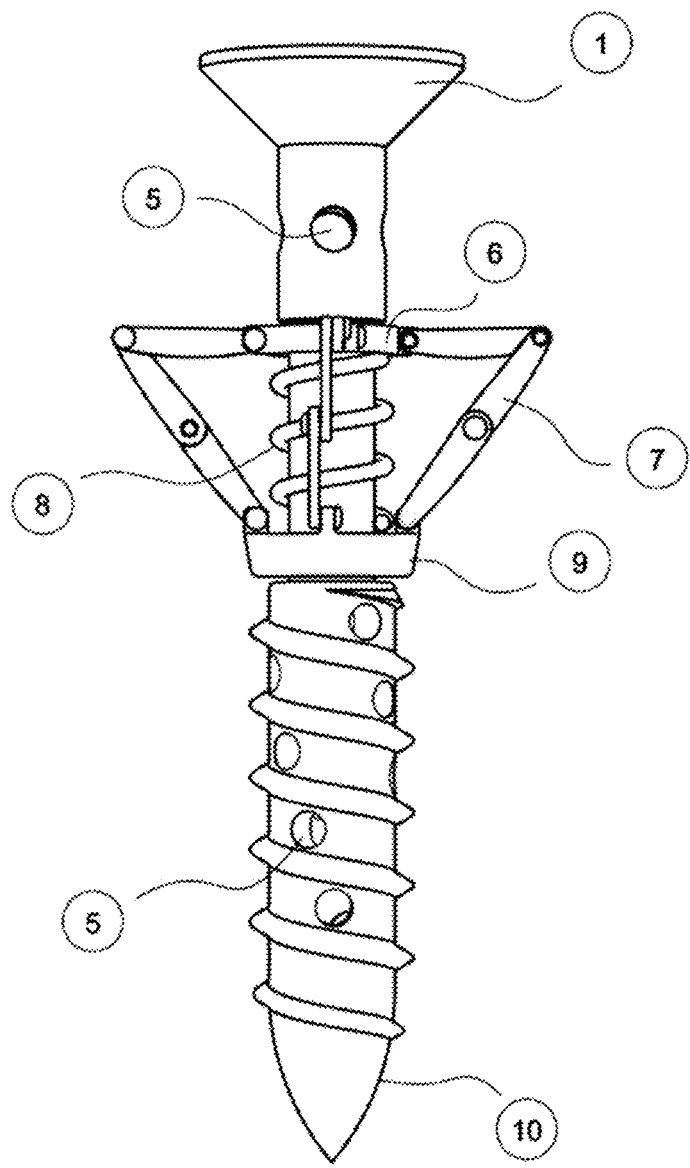
FIG. 15 shows improvement in the retractable arms adding a pivot point (7) and extra recessed hole for material expulsion in the spring and retractable arms channel.

FIG. 15 shows improvement in the retractable arms adding a pivot point 7 and extra recessed hole 4 for material expulsion in the spring and retractable arms channel.

Figure 16:
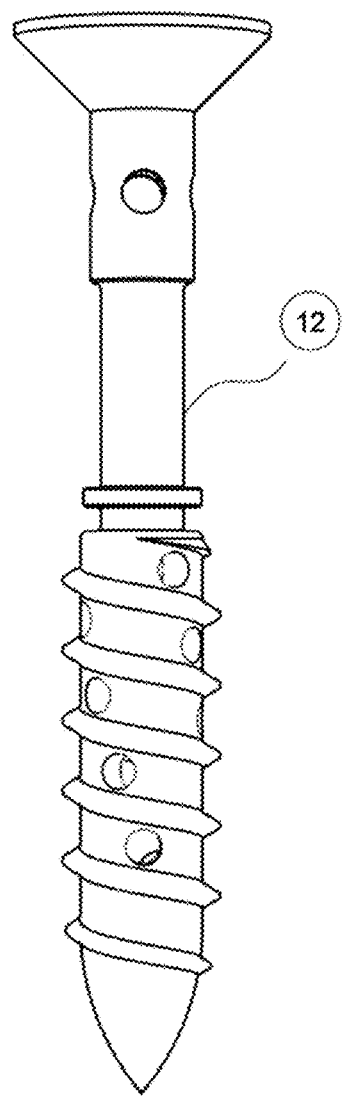
FIG. 16 shows improvement in the fastener body adding a fixed channel for keeping the retractable arms from movement in the lower part. The channel doesn't let move the lower part of the retractable arms up.

FIG. 16 shows improvement in the fastener body adding a fixed channel 12 for keeping the retractable arms from movement in the lower part. The channel doesn't let move the lower retractable arm holder 6 part of the retractable arms up.

Figure 17:
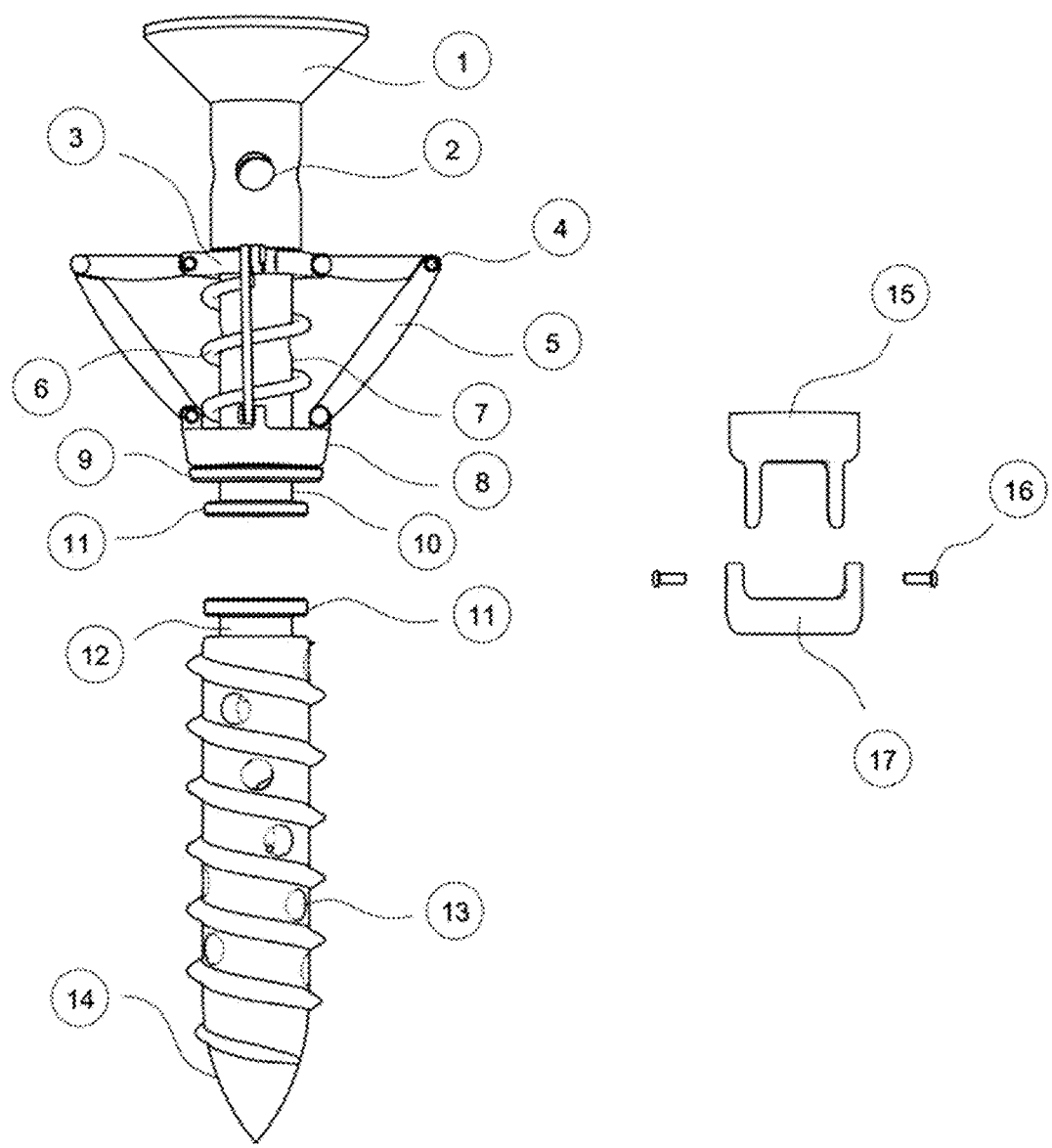
FIG. 17 shows mechanism that allow the fastener to rotate 360 degrees in his axis and allow the fastener to adjust the position lateral by a added pivotable and rotatable hinge for uses that require rotation and flexion similar as example as a human elbow or wrist move.

FIG. 17 shows a mechanism that allow the fastener to rotate 360 degrees in the axis and allow the fastener to adjust the position lateral by a added pivotable and rotatable hinge 15,16,17 that is attached to the body of the lower and upper part of the screw by two channels were are inserted by pressure in lower part channel 12, 11 and upper part 10, 11 in which for uses that require rotation and flexion similar as example as a human elbow or wrist move.

Figure 18:
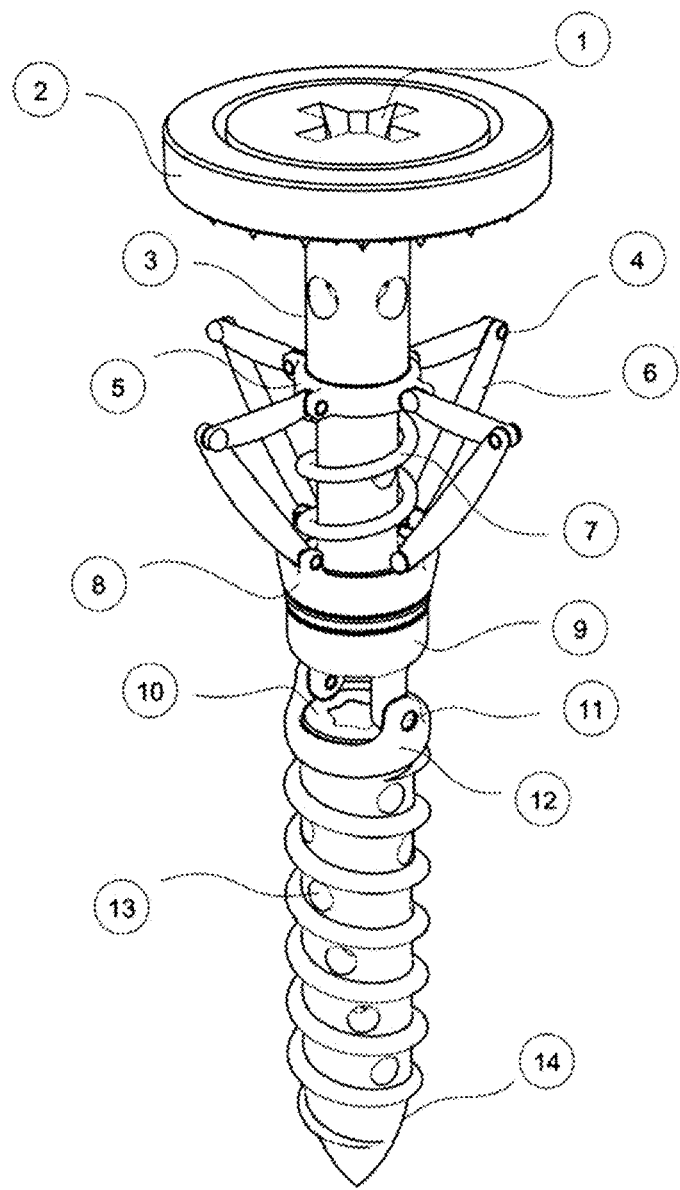
FIG. 18 shows a screw variation for rotation and lateral position adjustment assembled.
Figure 19:
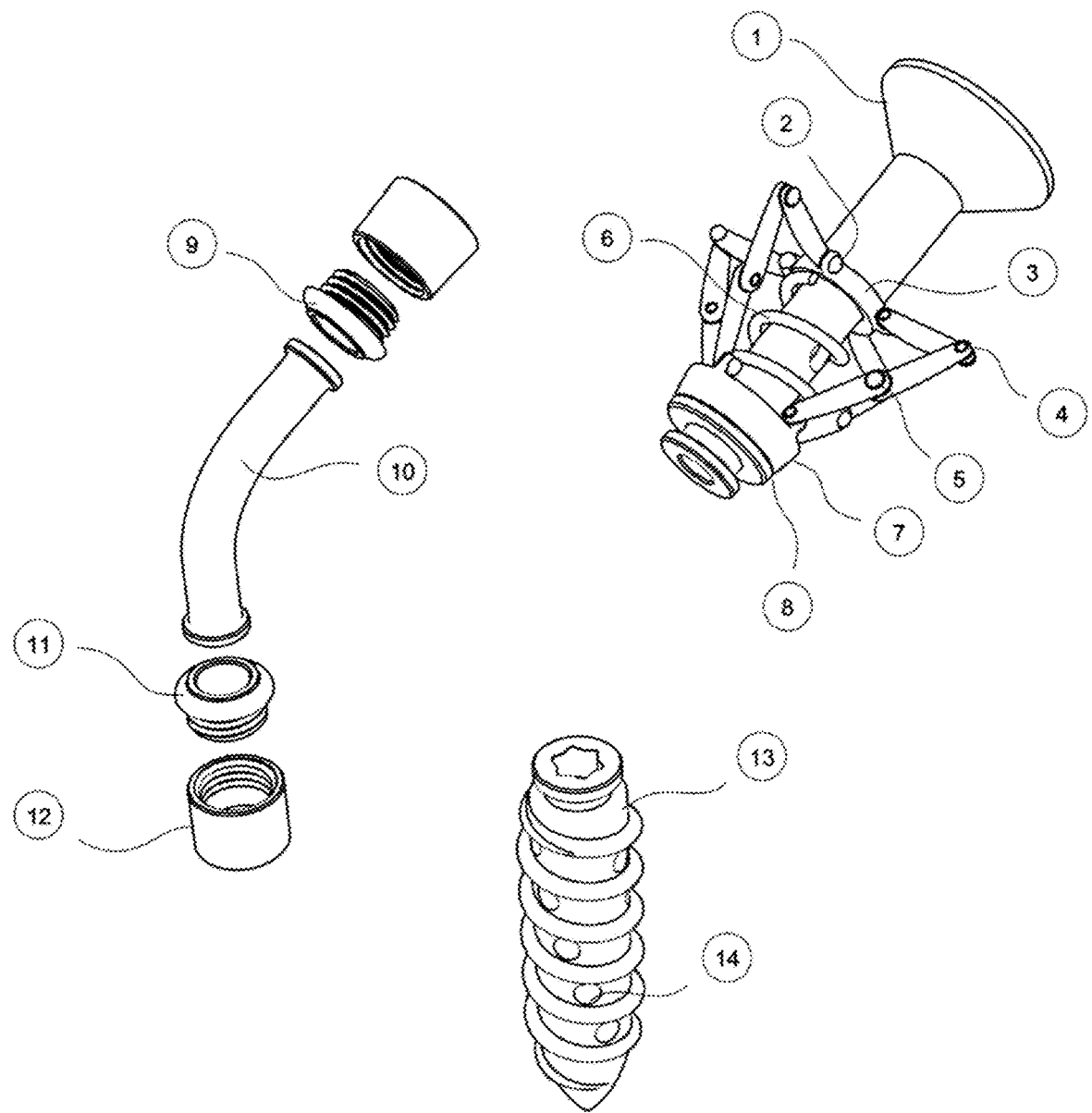
FIG. 19 shows variation of the fastener body with a middle elastic attachment between the lower and upper part for uses that require a compression and level adjustment letting the pieces having flexibility in movement as example a human elbow or wrist will move.
Figure 20:
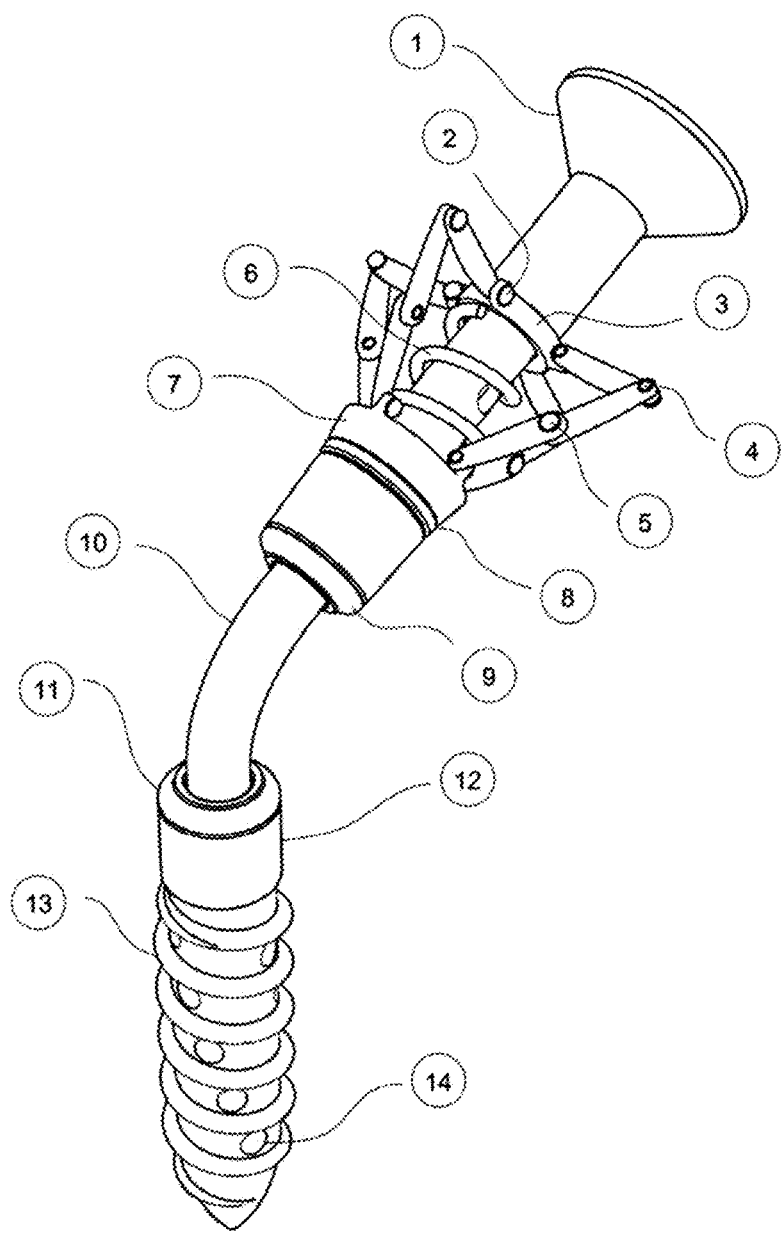
FIG. 20 shows screw with elastic body variation assembled.
Figure 21:
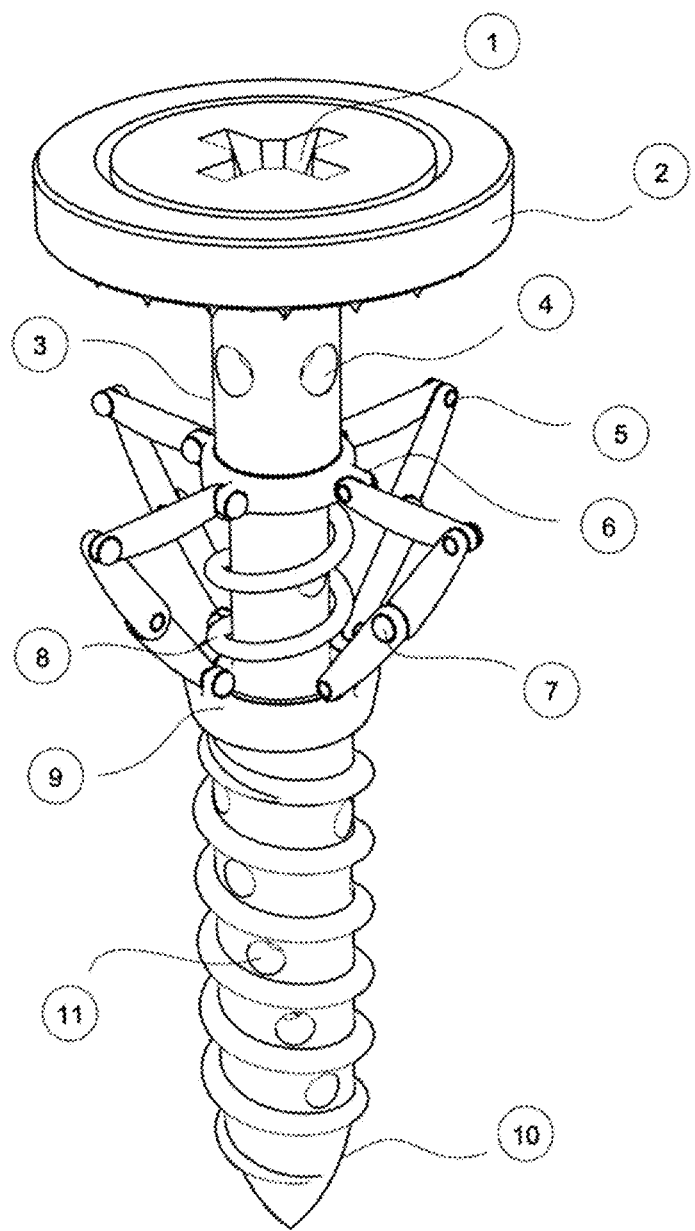
FIG. 21 shows a perspective view of the improvement in the retractable arms adding a pivot point 7 and extra recessed hole for material expulsion in the spring and retractable arms channel.

FIG. 18 shows a screw variation for rotation and lateral position feature adjustment assembled with upper view of the fastener lower part head 10 were the screw its tightened through especial flexible screwdriver with Phillips or other required screwdriver shape FIG. 19 shows variation of the fastener body with a middle elastic attachment composed by an elastic hose 10 a threaded insert for hose attachment and seal 9, 11 and the threaded and pressure connector 12 to attach the hose to the lower and upper part of the screw channels. For uses that require a compression and level adjustment letting the pieces having flexibility in movement as example a human elbow or wrist will move. FIG. 20 Shows screw with elastic body feature variation assembled.

The locking, clamping and injection screw for leveling adjustments described above is one embodiment of the leveling fastener according to the present invention.

Figure 22:
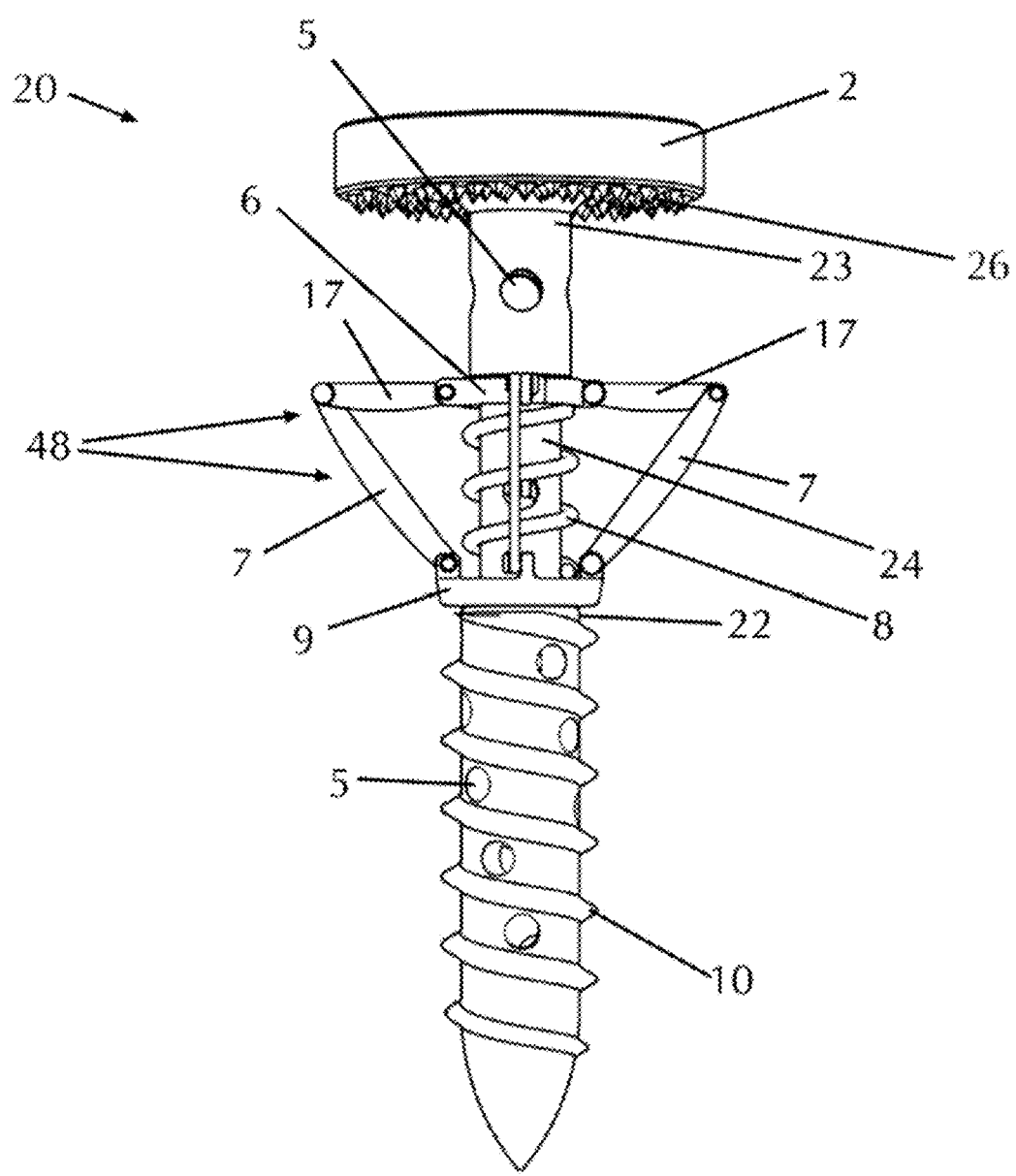
FIG. 22 is a side view of the fastener with dented or grip washer.

Another aspect of the present invention is directed to a fastener as shown in FIG. 22. The fastener 20 includes a cylindrical shank having a first shank end and a second shank end opposite the first shank end. The cylindrical shank has a head attached to the first shank end, the head having a tool slot. An example of the tool slot is shown at the top of FIG. 7. The tool slot is for engaging a tool and is directed away from the first shank end. The head has a lower head surface adjacent the shank. The cylindrical shank has a head collar 1 adjacent the head, a threaded collar 10 having securing threads, the threaded collar 10 disposed along a portion of the second shank end. The cylindrical shank has a shank smooth portion 12 disposed between the head collar 1 and the threaded collar 10. A thread shelf 22 terminates one end of the threaded portion and a tapered thread terminates the opposite end. The fastener has a grip washer 2 disposed along the head collar 1. The grip washer 2 has a first washer side with a plurality of protrusions and a second washer side having a profile corresponding with the lower head surface, wherein the grip washer 2 is rotatable about the head collar 1 and the lower head surface. The fastener includes a retractable frame 20 rotatable about the shank smooth portion. The retractable frame 20 includes a first choke 6 slidingly engaged with the shank smooth portion toward the head collar and a second choke 9 slidingly engaged with the shank smooth portion toward the threaded collar. The retractable frame 20 includes a plurality of upper frame arms 19 having a first length and pivotally attached at a first upper frame arm end to the first coke and a plurality of lower frame arms 7 having a second length longer than the first length, the lower frame arms 7 pivotally attached at a first lower frame member end to the second choke. The retractable frame 20 includes a plurality of pivot pins 11 for pivotally securing each corresponding lower frame arm second end opposite the lower frame arm first end to upper frame arm second end opposite the upper frame arm first end and a spring disposed on the shank smooth portion between the first choke and the second choke wherein the spring urges the first choke away from the second choke. In securing a first member 100 to a second member 102 (FIGS. 14*a*-14*e*), the first member having a first member opening, the leveling fastener 20 is inserted through the first member opening when the retractable frame is in a collapsed position. The threaded portion engages the second member for urging the retractable frame 48 through the first member opening and subsequently expanding the retractable frame 48 from the collapsed position to an extended position, moving the first member 100 toward the second member 102 and firmly securing the first member 100 a distance from the second member 102. The leveling fastener 20 may include a shank opening extending from a first shank end to a second shank end opposite the first shank end and a plurality of extrusion opening extending across the shank length and intersecting the shank opening whereby a fluid is injected in the shank opening and distributed to each of the plurality of extrusion openings. Preferable, the shank opening extends through the head of the leveling fastener whereby a fluid can be injected into the opening at the fastener head and delivered through the extrusion openings extending cross the shank opening. The fastener may include a protective cap disposed over the retractable frame. The fastener may include a fixed path channel for control of the retractable frame.

Figure 23:
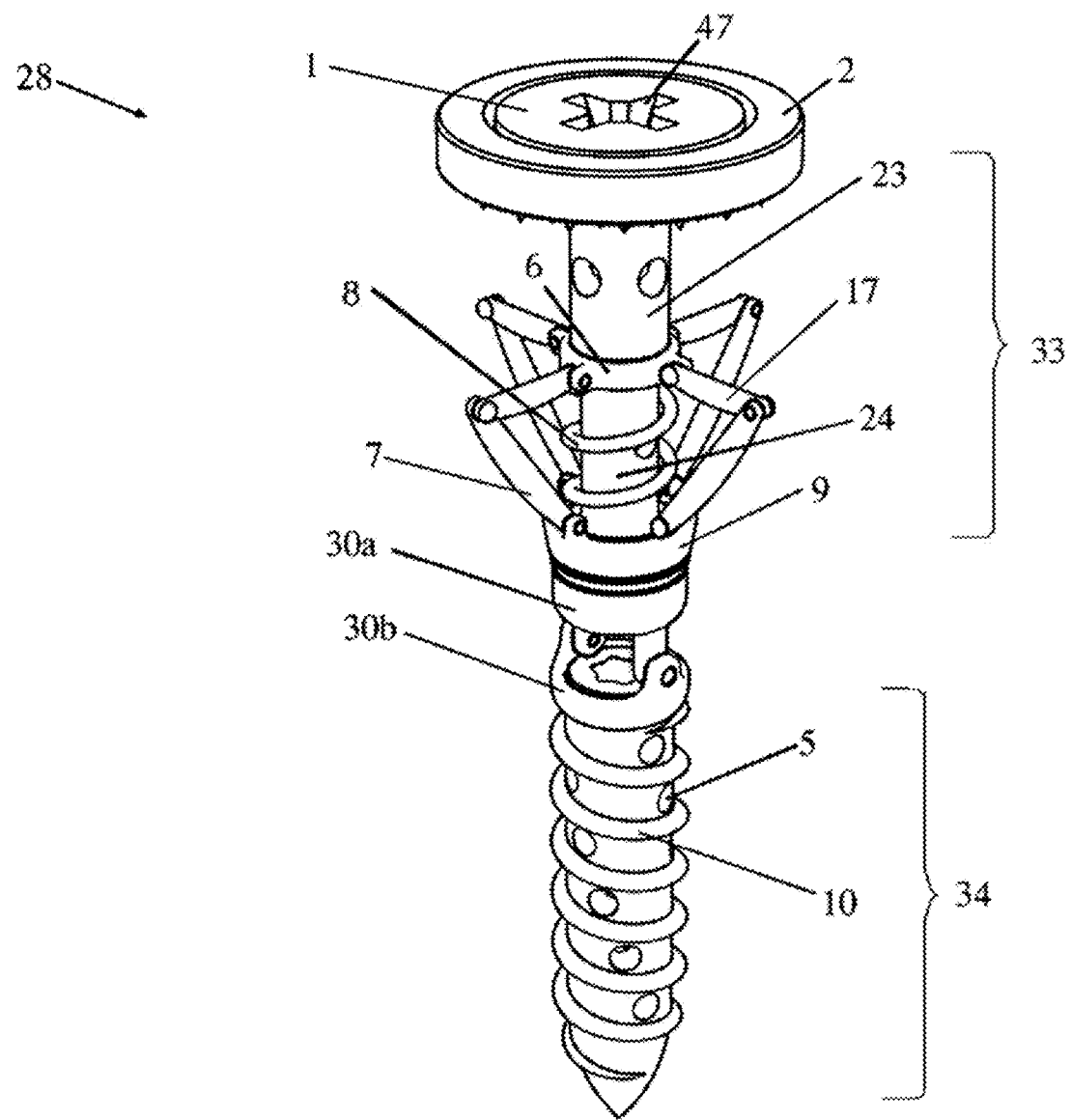
FIG. 23 shows an assembled screw variation for rotation and lateral position adjustment as shown in disassembled in FIG. 17.

Another aspect of the present invention is directed to a fastener 28 as shown in FIG. 23. The fastener 28 includes an upper shank 70 having a first upper shank end and a second upper shank end opposite the first upper shank end and a head 1 attached to the first upper shank end. The upper shank 70 the head 1 with a tool slot 47 for engaging a tool, the tool slot 47 directed away from the shank and a lower head surface adjacent the upper shank 70. The upper shank 70 has a head collar 23 adjacent the head 1. The upper shank 70 includes a lower collar disposed proximate to the upper attachment groove and a shank smooth 24 portion disposed between head collar 23 and the thread shelf 22 or threaded collar 22. A thread shelf 22 terminates one end of the threaded portion and a tapered thread terminates the opposite end. A grip washer 2 is disposed along the collar 23. The grip washer 2 as shown in FIG. 4 has a first washer side having a plurality of protrusions and a second washer side having a profile corresponding with the lower head surface. The protrusions 26 grip the surface of the first member and the smooth bevel surface 46 corresponding with the head lower surface 47 having a profile which corresponds to the grip washer bevel 49 to allow the head to slidingly rotate against the grip washer 2. A retractable frame, as shown in FIG. 5, rotatable about the shank smooth portion 24. The retractable frame 48 includes a first choke 6 slidingly engaged with the shank smooth portion 24 toward the head collar 23 and a second choke slidingly engaged with the shank smooth portion toward the threaded collar. The retractable frame 48 includes a plurality of upper frame arms 17 having a first length and pivotally attached at a first upper frame arm end to the first choke 6. The retractable frame 48 includes a plurality of lower frame arm 7 having a second length longer than the first length. The lower frame arms 7 are pivotally attached at a first lower frame member end to the second choke 9. There are a plurality of pivot pins 11 for pivotally securing each corresponding lower frame arm second end opposite the lower frame arm first end to upper frame arm second end opposite the upper frame arm first end. The retractable frame 48 includes a spring 8 disposed on the shank smooth portion 24 between the first choke and the second choke wherein the spring urges the first choke away from the second choke. The fastener 28 includes a lower shank 35 having a lower shank attachment groove 62 disposed adjacent one end of the lower shank and having securing threads 10 along an opposite end of the lower shank. The fastener 28 includes a rotatable hinge first portion 30*a* engageable with the upper shank attachment groove 60 or attachment flange 64 and a rotatable hinge second portion 30*b* engageable with the lower shank attachment groove 62 or attachment flange 66. The lower shank 35 is pivotably secured to the upper shank 33. The fastener 28 may include a shank opening extending from a first shank end to a second shank end opposite the first shank end and a plurality of extrusion openings 5 extending across the shank length and intersecting the shank opening whereby a fluid is injected in the shank opening, preferably into the head 1, and distributed to each of the plurality of extrusion openings 5. The fastener may include a protective cap disposed over the retractable frame. The rotatable hinge may be a flexible hose. The fastener may include a fixed path channel for control of the retractable frame.

Another aspect of the present invention is directed to a delivery fastener 84 for delivery of a fluid 85 as shown in FIGS. 6, 7 and 8. The delivery fastener 84 includes a cylindrical shank having a first shank end and a second shank end opposite the first shank end, a head attached to the first shank end, the head having a tool slot 96 (FIG. 7) for engaging a tool, the tool slot 96 directed away from the first shank end and a threaded shank portion having securing threads 99, the threaded shank portion disposed along a portion of the second shank end. The cylindrical shank includes an elongated axial shank opening 86 extending from the head 1 toward the second shank end and a plurality of extrusion openings extending radially outward from the elongated axial shank opening whereby a fluid is injected in the shank opening and distributed to each of the plurality of extrusion openings. The delivery fastener may include a grip washer 2 having a first surface having protrusions 26 for gripping and a second surface having a profile corresponding to a lower surface 93 (FIG. 6) of the fastener head 1.

The delivery fastener may include a retractable frame for allocating space for extrusion of the fluid from the extrusion openings. The frame is retractable from a first position wherein the frame is in an extended position for delivery of the fluid to a second position wherein the frame is collapsed for insertion of the delivery fastener through a surface opening in a surface to be secured.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A leveling fastener for securing a first member to a second member, the leveling fastener comprising:
   a cylindrical shank having;
      a first shank end and a second shank end opposite the first shank end;
      a head attached to the first shank end, the head having a tool slot for engaging a tool, the tool slot directed away from the first shank end and a lower head surface adjacent the shank;
      a head collar adjacent the head;
      a threaded collar having securing threads, the threaded collar disposed along a portion of the second shank end;
      a shank smooth portion disposed between head collar and the threaded collar;
      a grip washer disposed along the collar having a first washer side having a plurality of protrusions and a second washer side having a profile corresponding with the lower head surface, wherein the grip washer is rotatable about the collar and the lower head surface;
   a retractable frame rotatable about the shank smooth portion, the retractable frame having:
      a first choke slidingly engaged with the shank smooth portion toward the head collar;
      a second choke slidingly engaged with the shank smooth portion toward the threaded collar;
      a plurality of upper frame arms having a first length and pivotally attached at a first upper frame arm end to the first choke;
      a plurality of lower frame arm having a second length longer than the first length, the lower frame arms pivotally attached at a first lower frame member end to the second choke;
      a plurality of pivot pins for pivotally securing each corresponding lower frame arm second end opposite the lower frame arm first end to upper frame arm second end opposite the upper frame arm first end; and
      a spring disposed on the shank smooth portion between the first choke and the second choke wherein the spring urges the first choke away from the second choke;
   wherein the first member has a first member opening and the leveling fastener is insertable through the first member opening when the retractable frame is in a collapsed position; and
   wherein the threaded portion engages the second member for urging the retractable frame through the first member opening and subsequently expanding the retractable frame the collapsed position to an extended position moving the first member toward the second member and firmly securing the first member a distance from the second member.

2. The fastener according to claim 1 wherein the plurality of upper frame arms each comprise a first upper arm pivotally attached to a second upper arm.

3. The fastener according to claim 1 including a shank opening extending from a first shank end to a second shank end opposite the first shank end and a plurality of extrusion opening extending across the shank length and intersecting the shank opening whereby a fluid is injected in the shank opening and distributed to each of the plurality of extrusion openings.

4. The fastener according to claim 1 including a protective cap disposed over the retractable frame.

5. The fastener according to claim 1 including a fixed path channel for control of the retractable frame.

6. A fastener comprising:
an upper shank having:
  a first upper shank end and a second upper shank end opposite the first upper shank end;
  a head attached to the first upper shank end, the head having a tool slot for engaging a tool, the tool slot directed away from the shank end and a lower head surface adjacent the shaft;
  a head collar adjacent the head;
  an upper shank attachment groove disposed adjacent the second upper shank end;
  a lower collar disposed proximate to the upper attachment groove;
  a shank smooth portion disposed between head collar and the threaded collar;
  a grip washer disposed along the collar having a first washer side having a plurality of protrusions and a second washer side having a profile corresponding with the lower head surface, wherein the grip washer is rotatable about the collar and the lower head surface;
a retractable frame rotatable about the shank smooth portion, the retractable frame having:
  a first choke slidingly engaged with the shank smooth portion toward the head collar;
  a second choke slidingly engaged with the shank smooth portion toward the threaded collar;
  a plurality of upper frame arms having a first length and pivotally attached at a first upper frame arm end to the first choke;
  a plurality of lower frame arm having a second length longer than the first length, the lower frame arms pivotally attached at a first lower frame member end to the second choke;
  a plurality of pivot pins for pivotally securing each corresponding lower frame arm second end opposite the lower frame arm first end to upper frame arm second end opposite the upper frame arm first end; and
  a spring disposed on the shank smooth portion between the first choke and the second choke wherein the spring urges the first choke away from the second choke;
a lower shank having a lower shank attachment groove disposed adjacent one end of the lower shank and having securing threads along an opposite end of the lower shank;
a rotatable hinge engageable with the upper shank attachment groove and the lower shank attachment groove for pivotably securing the upper shank with the lower shank.

7. The fastener according to claim 6 including a shank opening extending from a first shank end to a second shank end opposite the first shank end and a plurality of extrusion opening extending across the shank length and intersecting the shank opening whereby a fluid is injected in the shank opening and distributed to each of the plurality of extrusion openings.

8. The fastener according to claim 6 including a protective cap disposed over the retractable frame.

9. The fastener according to claim 6 wherein the rotatable hinge is a flexible hose.

10. The fastener according to claim 6 including a fixed path channel for control of the retractable frame.

11. The fastener according to claim 6 wherein the plurality of upper frame arms each comprise a first upper arm pivotally attached to a second upper arm.

12. A delivery fastener for delivery of a fluid, the fastener comprising:
a cylindrical shank having;
  a first shank end and a second shank end opposite the first shank end;
  a head attached to the first shank end, the head having a tool slot for engaging a tool, the tool slot directed away from the first shank end;
  a threaded shank portion having securing threads, the threaded shank portion disposed along a portion of the second shank end;
  an elongated axial shank opening extending from the head toward the second shank end and a plurality of extrusion openings extending radially outward from the elongated axial shank opening whereby a fluid is injected in the shank opening and distributed to each of the plurality of extrusion openings.

13. The delivery fastener according to claim 12 including a frame for allocating space for extrusion of the fluid from the extrusion openings.

14. The delivery fastener according to claim 13 wherein the frame is a retractable frame retractable from a first position wherein the frame is in an extended position for delivery of the fluid to a second position wherein the frame is collapsed for insertion of the delivery fastener through a surface opening in a surface to be secured.

15. The delivery fastener according to claim 13 including a grip washer having a first surface having protrusions for gripping a surface and a second surface having a profile corresponding to a lower surface of the fastener head.

* * * * *